(12) United States Patent
Bharatiya et al.

(10) Patent No.: US 12,076,734 B2
(45) Date of Patent: Sep. 3, 2024

(54) SECTIONAL BOOM HEIGHT CONTROL OF INDIVIDUAL SECTION FOR SPRAYERS AND SYSTEM THEREOF

(71) Applicant: DEERE & COMPANY, Moline, IL (US)

(72) Inventors: Paresh Bharatiya, Pune (IN); Sandeep Mahajan, Pune (IN); Manojkumar Girhe, Pune (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/579,757

(22) Filed: Jan. 20, 2022

(65) Prior Publication Data

US 2022/0143632 A1  May 12, 2022

Related U.S. Application Data

(63) Continuation of application No. 16/018,653, filed on Jun. 26, 2018, now abandoned.

(60) Provisional application No. 62/570,752, filed on Oct. 11, 2017.

(51) Int. Cl.
| | |
|---|---|
| *B05B 1/20* | (2006.01) |
| *A01M 7/00* | (2006.01) |
| *B05B 15/68* | (2018.01) |
| *A01N 3/00* | (2006.01) |

(52) U.S. Cl.
CPC ............ *B05B 1/20* (2013.01); *A01M 7/0057* (2013.01); *B05B 15/68* (2018.02); *A01M 7/0071* (2013.01); *A01N 3/00* (2013.01)

(58) Field of Classification Search
CPC .. B05B 15/68; B05B 1/20; B05B 1/28; B05B 12/32–36; A01G 25/09; A01M 7/0042; A01M 7/0053; A01M 7/0057; A01M 7/006; A01M 7/0071; A01M 7/0075; A01M 7/0082; A01M 7/0089
USPC .......... 239/159–164, 166–169, 103
See application file for complete search history.

(56) References Cited

U.S. PATENT DOCUMENTS

| | | | |
|---|---|---|---|
| 3,190,590 A | 6/1965 | Ripper et al. | |
| 4,186,879 A * | 2/1980 | Kinder | A01M 7/0064 280/415.1 |
| 4,518,118 A | 5/1985 | Takata | |
| 4,878,616 A | 11/1989 | Richardson | |

(Continued)

FOREIGN PATENT DOCUMENTS

| | | |
|---|---|---|
| CN | 203120802 U | 8/2013 |
| EP | 1949974 A1 | 7/2008 |

OTHER PUBLICATIONS

European Patent Office (EPO), Munich Germany; European Search Report of European Patent Application No. 18199894.9; Date: Dec. 12, 2018; pp. 1-6.

*Primary Examiner* — Jason J Boeckmann
(74) *Attorney, Agent, or Firm* — Taft Stettinius & Hollister LLP; Stephen F. Rost

(57) ABSTRACT

A spray boom of a spray boom assembly includes a boom frame and a spray section coupled to the boom frame. The spray section includes an elongated spray pipe configured to be fluidly coupled to a fluid source and a nozzle coupled to the spray pipe. An actuator is coupled at one end to the boom frame and at an opposite end to the spray section. The actuator controllably extends and retracts to move the spray pipe and nozzle between a raised position and a lowered position.

20 Claims, 7 Drawing Sheets

(56) References Cited

U.S. PATENT DOCUMENTS

| | | | |
|---|---|---|---|
| 4,892,256 A | | 1/1990 | Brown et al. |
| 5,348,226 A | | 9/1994 | Heiniger et al. |
| 5,507,435 A | | 4/1996 | Benest |
| 5,673,854 A | * | 10/1997 | Kinder ................ A01M 7/0064 239/164 |
| 6,293,475 B1 | | 9/2001 | Sobolik |
| 6,820,828 B1 | | 11/2004 | Greenwalt |
| 8,688,331 B2 | | 4/2014 | Peterson et al. |
| 2011/0153168 A1 | | 6/2011 | Peterson et al. |
| 2011/0266365 A1 | | 11/2011 | Hrnicek et al. |
| 2013/0119153 A1 | | 5/2013 | Hoeben |
| 2014/0277676 A1 | | 9/2014 | Gattis et al. |
| 2016/0121355 A1 | | 5/2016 | Claussen et al. |
| 2017/0027103 A1 | | 2/2017 | Grotelueschen et al. |

\* cited by examiner

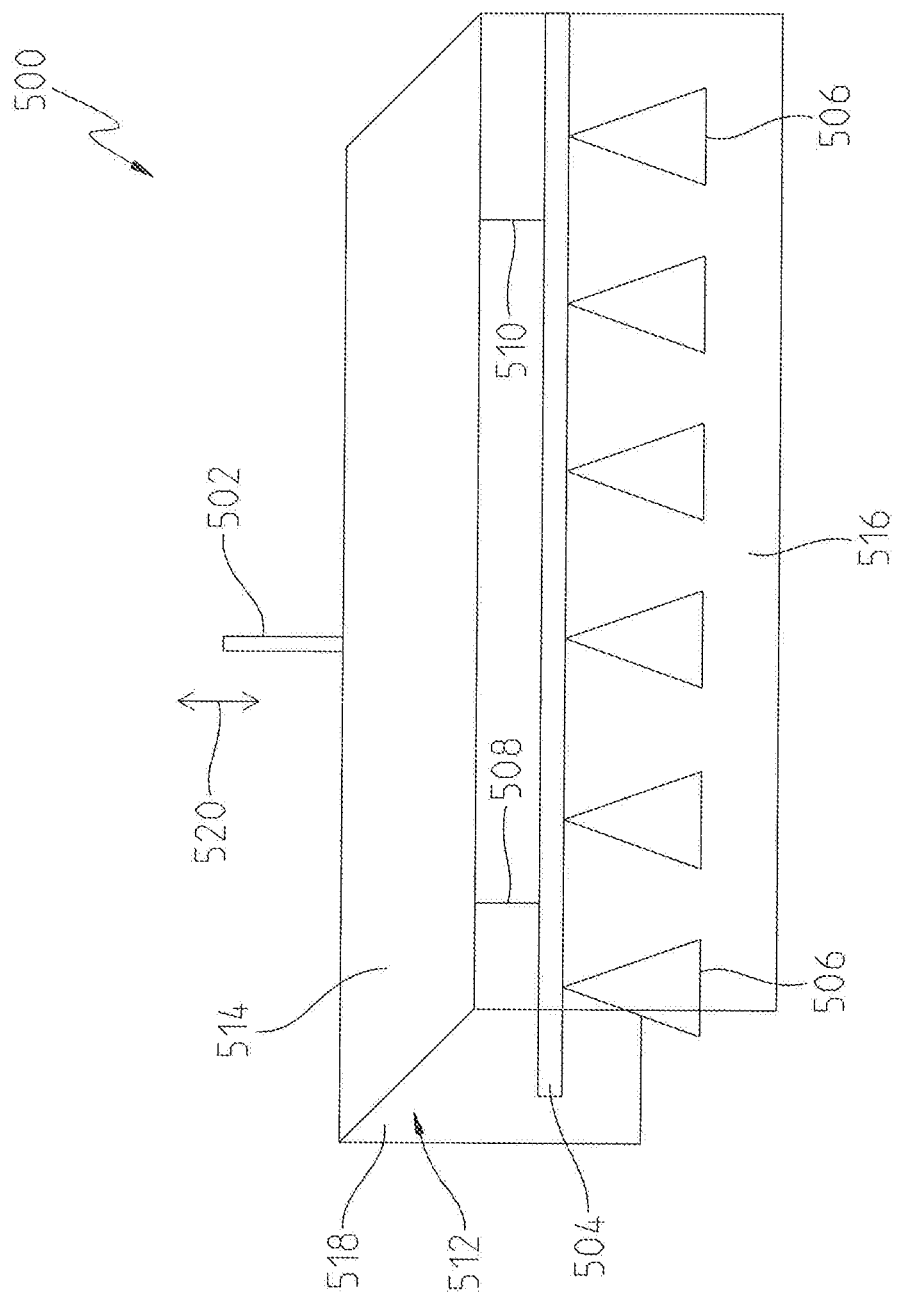

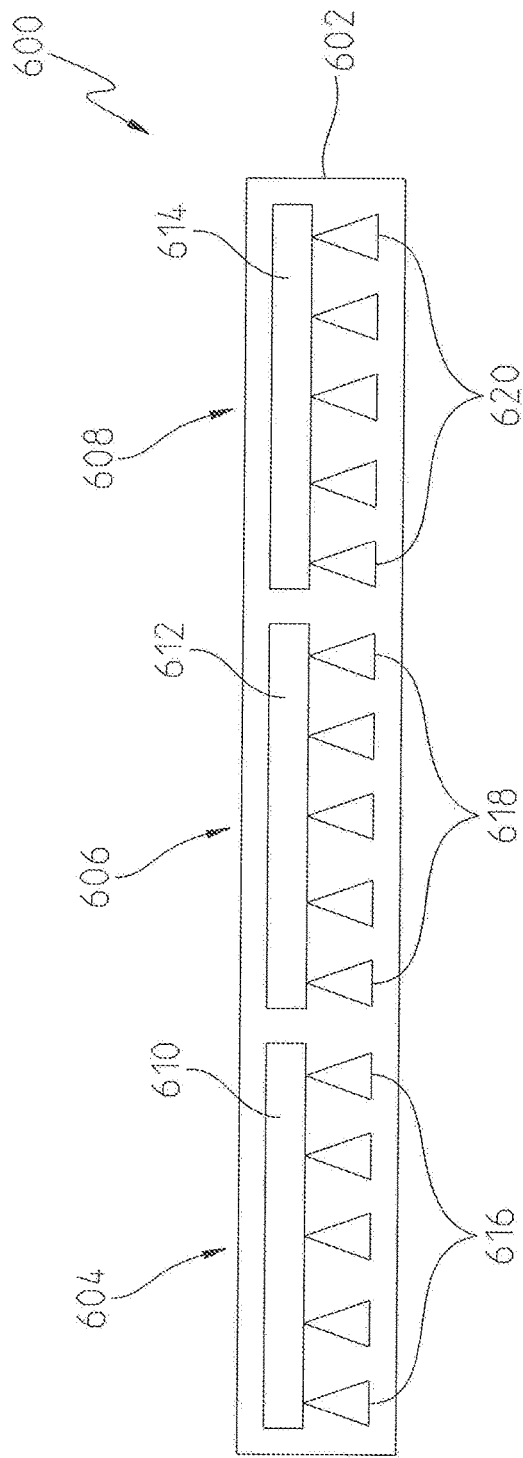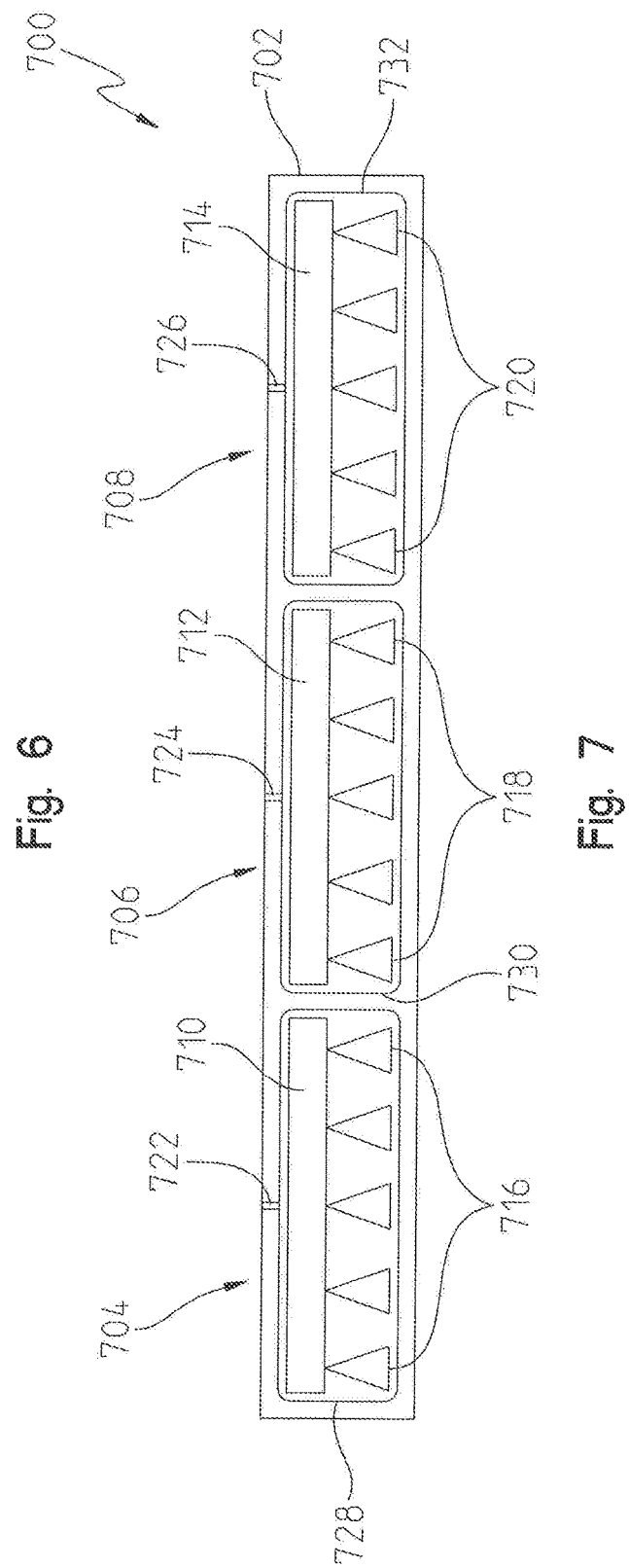

SECTIONAL BOOM HEIGHT CONTROL OF INDIVIDUAL SECTION FOR SPRAYERS AND SYSTEM THEREOF

RELATED APPLICATIONS

This application is a continuation application of U.S. patent application Ser. No. 16/018,653, filed Jun. 26, 2018, which claims the benefit of U.S. Provisional Patent Application Ser. No. 62/570,752, filed Oct. 11, 2017, the disclosures of which are hereby incorporated by reference in their entirety.

FIELD OF THE DISCLOSURE

The present disclosure relates to a sprayer, and in particular, to a sprayer control system for controlling sectional boom height of a sprayer.

BACKGROUND

Agricultural machines, such as a sprayer, may include a center frame with a spray boom pivotably attached thereto on each side of the frame. Nozzles may be rigidly connected to the booms for spraying a chemical substance onto a field. Each boom may tilt relative to the center frame during operation, particularly if an object is in the path of travel of the sprayer. Moreover, the center frame and booms may be lifted together in unison to achieve different spray heights.

Conventional control algorithms may be programmed to add some error in spray heights to accommodate different terrain. As described, if an obstacle is in the path of travel of the spray near an end of the boom, then the entire boom is raised or tilted to avoid the obstacle. This causes some problems with losses in productivity because the chemical spray may not reach the crop in the desired amount. Further, the chemical spray may drift due to the wind when the boom is raised and be disposed on a non-targeted area. Therefore, conventional sprayers and their respective control systems are unable to manage boom height control due to changes in terrain and when obstacles are disposed in the path of travel of the sprayer. Moreover, conventional sprayers may not be able to control spray drift due to their current configurations.

Thus, there is a need for improved boom height control and drift control over conventional sprayers and spray control systems.

SUMMARY

In one embodiment of the present disclosure, a spray boom of a spray boom assembly includes a boom frame; a spray section coupled to the boom frame, the spray section including an elongated spray pipe configured to be fluidly coupled to a fluid source; a nozzle coupled to the spray pipe and configured to be fluidly coupled to the fluid source, the nozzle including a tip for distributing a fluid; an actuator coupled at one end to the boom frame and at an opposite end to the spray section; wherein, the actuator controllably extends and retracts to move the spray pipe and nozzle between a raised position and a lowered position.

In one example of this embodiment, a plumbing frame is provided to which the spray pipe is coupled, the plumbing frame being movable by the actuator between the raised position and the lowered position. In a second example, the boom includes a protective cover of the spray section for at least partially surrounding the spray pipe and the nozzle. In a third example, the protective cover includes at least one wall that extends downwardly to a location that is lower than the nozzle in its lowered position. In a fourth example, the protective cover includes a top portion, a first side wall, and a second side wall; the first actuator being coupled to the top portion to move the spray section in a substantially linear direction between the raised and lowered positions.

In a fifth example, the spray boom may include a first actuator coupled at one end to the protective cover and at an opposite end to the spray pipe; a second actuator coupled at one end to the protective cover and at an opposite end to the spray pipe; wherein, the first actuator and second actuator are spaced along the spray pipe from one another; further wherein, the first actuator operably moves one end of the spray pipe relative to the protective cover, and the second actuator operably moves an opposite end of the spray pipe relative to the protective cover. In a sixth example of this embodiment, the actuator operably moves the protective cover, the first and second actuators, the spray pipe, and the nozzle relative to the boom frame.

In another example, the spray boom may include a second actuator coupled at one end to the boom frame and at an opposite end to the spray section, the second actuator being spaced from the first actuator along the spray pipe such that the first actuator is disposed near one end of the spray pipe and the second actuator is disposed near an opposite end of the spray pipe; wherein, the second actuator controllably extends and retracts to move the spray pipe between a raised position and a lowered position. In a further example, the first actuator and the second actuator are controllably actuated independently of one another. In yet a further example, the spray boom may include a second spray section coupled to the boom frame, the second spray section including a second elongated spray pipe configured to be fluidly coupled to the fluid source; a second nozzle coupled to the second spray pipe and configured to be fluidly coupled to the fluid source; a second actuator coupled at one end to the boom frame and at an opposite end to the second spray section; wherein, the second actuator controllably extends and retracts to move the second spray pipe and the second nozzle between a raised position and a lowered position; further wherein, the first actuator and the second actuator are operably controlled independently of one another.

In another embodiment of this disclosure, a spray boom assembly includes a plurality of boom frames including at least a first boom frame and a second boom frame; the first boom frame comprising a first spray section coupled thereto, the first spray section including a first spray pipe and a first nozzle, the first spray pipe and first nozzle configured to be fluidly coupled to a fluid source; the second boom frame comprising a second spray section coupled thereto, the second spray section including a second spray pipe and a second nozzle, the second spray pipe and second nozzle configured to be fluidly coupled to the fluid source; a first actuator coupled at one end to the first boom frame and at an opposite end to the first spray section; a second actuator coupled at one end to the second boom frame and at an opposite end to the second spray section; wherein, the first actuator controllably extends and retracts to move the first spray pipe and the first nozzle between a raised position and a lowered position, and the second actuator controllably extends and retracts to move the second spray pipe and the second nozzle between a raised position and a lowered position; further wherein, the first actuator and the second actuator are operably controlled independently of one another.

In one example of this embodiment, the assembly may include a third spray section coupled to the first boom frame and having a third spray pipe and a third nozzle, and a third actuator coupled between the first boom frame and the third spray section for controllably actuating the third spray section between a raised position and a lowered position, wherein the third actuator is controlled independently of the first and second actuators. In a second example, the assembly may include a third actuator coupled at one end to the first boom frame and at an opposite end to the first spray pipe, the third actuator being spaced from the first actuator along the first spray pipe; wherein, the first actuator and the third actuator are controlled independently of one another. In a third example, the spray boom assembly may include a fourth actuator coupled at one end to the second boom frame and at an opposite end to the second spray pipe, the fourth actuator being spaced from the second actuator along the second spray pipe; wherein, the first, second, third and fourth actuators are controlled independently of one another.

In a fourth example, the plurality of boom frames may include a third boom frame having a third spray section coupled thereto, the third spray section including a third spray pipe and a third nozzle, the third spray pipe and the third nozzle configured to be fluidly coupled to the fluid source; and a third actuator coupled at one end to the third boom frame and at an opposite end to the third spray section; wherein, the third actuator is operably controlled independently of the first and second actuators. In another example of this embodiment, the first spray section may include a plurality of spray sections, each of the plurality of spray sections including a spray pipe and a nozzle coupled thereto, where each of the plurality of spray sections further includes an actuator coupled between the first boom frame and each spray pipe of each spray section, wherein, each of the actuators operably controlling movement of each of the plurality of spray sections independently of the other spray sections.

In a further embodiment of this disclosure, a spray boom assembly being transported by a work vehicle in a direction of travel for performing a spraying operation on a field includes a control system comprising a controller for operably controlling the spray boom assembly; a center frame; a first boom and a second boom pivotally coupled to the center frame, the first boom extending transversely from one side of the center frame relative to the direction of travel and the second boom extending transversely from an opposite side of the center frame; the first boom including a first boom frame and the second boom including a second boom frame; the first boom frame comprising a first spray section coupled thereto, the first spray section including a first spray pipe and a first nozzle, the first spray pipe and first nozzle configured to be fluidly coupled to a fluid source; the second boom frame comprising a second spray section coupled thereto, the second spray section including a second spray pipe and a second nozzle, the second spray pipe and second nozzle configured to be fluidly coupled to the fluid source; a first actuator coupled at one end to the first boom frame and at an opposite end to the first spray section, the first actuator being operably controlled by the controller; a second actuator coupled at one end to the second boom frame and at an opposite end to the second spray section, the second actuator being operably controlled by the controller; wherein, the first actuator controllably extends and retracts to move the first spray pipe and the first nozzle between a raised position and a lowered position, and the second actuator controllably extends and retracts to move the second spray pipe and the second nozzle between a raised position and a lowered position; further wherein, the controller operably controls the first actuator and the second actuator independently of one another.

In one example of this embodiment, the spray boom assembly may include a first tilt actuator coupled at one end to the center frame and at an opposite end to the first boom for pivotably moving the first boom relative to the center frame; a second tilt actuator coupled at one end to the center frame and at an opposite end to the second boom for pivotably moving the second boom relative to the center frame; wherein, the first tilt actuator and the second tilt actuator are operably controlled by the controller; further wherein, the controller operably controls the first actuator, the second actuator, the first tilt actuator and the second tilt actuator independently of one another. In another example, the spray boom assembly may include a plurality of sensors disposed in electrical communication with the controller, where a first sensor of the plurality of sensors is disposed on the first spray pipe for detecting a distance between the first spray section and a target; wherein, the controller is configured to receive the distance detected by the first sensor, and compare the first distance to a target distance; further wherein, the controller operably controls the first actuator to move the first spray section until the distance detected by sensor is approximately the same as the target distance.

In a further example of this embodiment, the spray boom assembly may include a third actuator coupled at one end to the first boom frame and at an opposite end to the first spray pipe, the third actuator being spaced from the first actuator along the first spray pipe; and a fourth actuator coupled at one end to the second boom frame and at an opposite end to the second spray pipe, the fourth actuator being spaced from the second actuator along the second spray pipe; wherein, the third and fourth actuators are operably controlled by the controller; wherein, the controller operably controls the first actuator, the second actuator, the third actuator, and the fourth actuator independently of one another.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 5 is a schematic of a movable plumbing frame of a sprayer with a protective cover;

FIG. 6 is a schematic of one embodiment of the frame of FIG. 5;

FIG. 7 is a schematic of a second embodiment of the frame of FIG. 5; and

Corresponding reference numerals are used to indicate corresponding parts throughout the several views.

DETAILED DESCRIPTION

Figure 1:
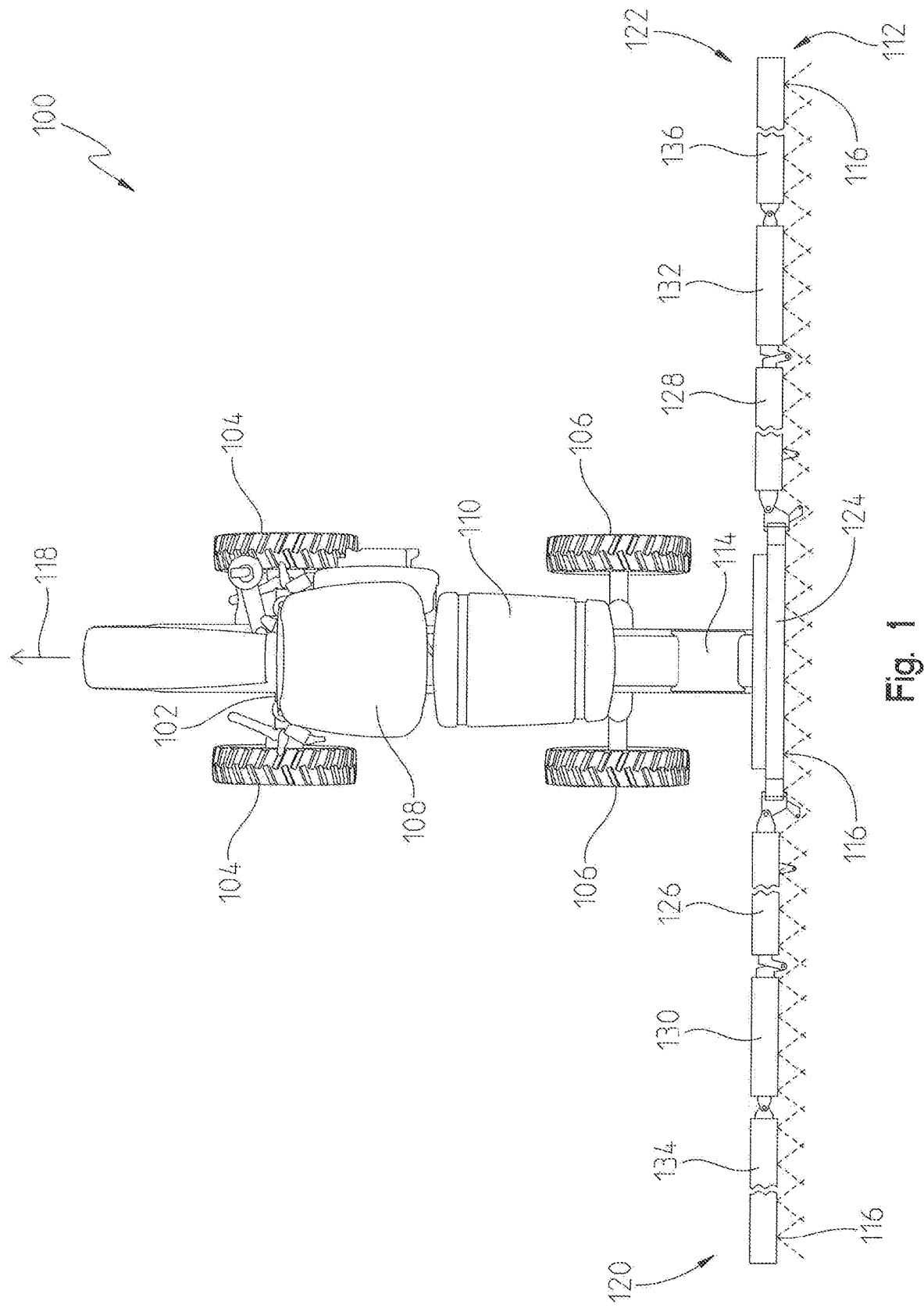
FIG. 1 is a top view of a sprayer system attached to a work machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Referring to FIG. 1, an example of a vehicle carrying a spray boom with spray nozzles mounted on the boom. The vehicle may be a platform or dolly for industrial spray applications or a tractor towing ground-engaging tillage left/right wings with disks and shanks, or a planter towing a row of seed dispenser modules. In the illustrated embodiment of FIG. 1, the vehicle is a towed sprayer or a self-propelled agricultural sprayer 100 including a vehicle main frame 102 and an attached autonomous control station or an operator cab 108 for controlling the sprayer 100. The main frame 102 may be supported by a plurality of ground-engaging mechanisms. In FIG. 1, a pair of front wheels 104 and a pair of rear wheels 106 support the main frame and may propel the vehicle in at least a forward travel direction 118. A tank 110 may be mounted to the frame 102 or another frame (not shown) which is attached to the main frame 102. The tank 110 may contain a spray liquid or other substance to be discharged during a spraying operation.

A fixed or floating center frame 114 is coupled to a front or a rear of the main frame 102. In FIG. 1, the center frame 114 is shown coupled to the rear of the main frame 102. The center frame 114 may support an articulated folding spray boom assembly 112 that is shown in FIG. 1 in its fully extended working position for spraying a field. In other examples, the spray boom assembly 112 may be mounted in front of the agricultural sprayer 100.

A plurality of spray nozzles 116 can be mounted along a fluid distribution pipe or spray pipe (not shown) that is mounted to the spray boom assembly 112 and fluidly coupled to the tank 110. Each nozzle 116 can have multiple spray outlets, each of which conducts fluid to a same-type or different-type of spray tip. The nozzles 116 on the spray boom assembly 112 can be divided into boom frames or wing structures such as 124, 126, 128, 130, 132, 134, and 136 (or collectively "spray section(s)"). In FIG. 1, the plurality of groups or sections may include a center boom frame 124 which may be coupled to the center frame 114. Although not shown in FIG. 1, a lift actuator may be coupled to the center frame 114 at one end and to the center boom frame 124 at the opposite end for lifting or lowering the center boom frame 124.

The spray boom assembly 112 may be further divided into a first or left boom 120 and a second or right boom 122. In FIG. 1, the first boom 120 is shown on a left side of the spray boom assembly 112, and the second boom 122 is depicted on the right side thereof. In some instances, a left-most portion of the center boom frame 124 may form part of the first boom 120 and a right-most portion may form part of the second boom 122. In any event, the first boom 120 may include those boom frames which are disposed on a left-hand side of the spray boom assembly 112 including a first inner boom frame 126 (or commonly referred to as a "left inner wing"), a first outer boom frame 130 (or commonly referred to as a "lift outer wing"), and a first breakaway frame 134. Similarly, the second boom 122 may include those boom frames which are disposed on a right-hand side of the spray boom assembly 112 including a second inner boom frame 128 (or commonly referred to as a "right inner wing"), a second outer boom frame 132 (or commonly referred to as a "right outer wing"), and a second breakaway frame 136. Although seven boom frames are shown, there may any number of boom frames that form the spray boom assembly 112.

As shown in FIG. 1, the first boom frame 126 may be pivotally coupled to the center boom frame 124 via various mechanical couplings. Other means for coupling the first boom frame 126 to the center boom frame 124 may be used. Similarly, the first outer boom frame 130 may be coupled to the first inner boom frame 126, and the first breakaway frame 134 may be coupled to the first outer boom frame 130. In some cases, these connections may be rigid connections, whereas in other embodiments the frames may be pivotably coupled to one another. Moreover, the second inner boom frame 128 may be coupled to the center boom frame 124, and the second outer boom frame 132 may be coupled to the second inner boom frame 128. Likewise, the second breakaway frame 136 may be coupled to the second outer boom frame 136. These couplings may be pivotal connections or rigid connections depending upon the type of boom.

In a conventional spray boom assembly, a tilt actuator may be provided for tilting each boom with respect to the center frame. In FIG. 1, for example, a first tilt actuator may be coupled at one end to the center frame 114 or the center boom frame 124, and at an opposite end to the first boom 120. During operation, the first boom 120 may be pivoted with respect to the center frame 114 or center boom frame 124 such that the first breakaway frame 134 may reach the highest point of the first boom 120. This may be useful if the sprayer 100 is moving in the travel direction 118 and an object is in the path of the first boom 120 such that the tilt actuator (not shown) may be actuated to raise the first boom 120 to avoid contacting the object. The same may be true of the second boom 122. Here, a second tilt actuator (not shown) may be actuated to pivot the second boom 122 with respect to the center frame 114 or the center boom frame 124.

As described above, one of the challenges with a conventional boom is that actuating the tilt cylinder may cause the entire boom, i.e., each of its individual frames, to raise or lower with respect to the ground. As this happens, the distance between each nozzle and the ground changes and may result in the distance exceeding a target distance. In effect, this can cause the spray from each nozzle to drift into non-targeted areas or not reach desired targets. The spraying operation can be ineffective and non-productive.

Figure 2:
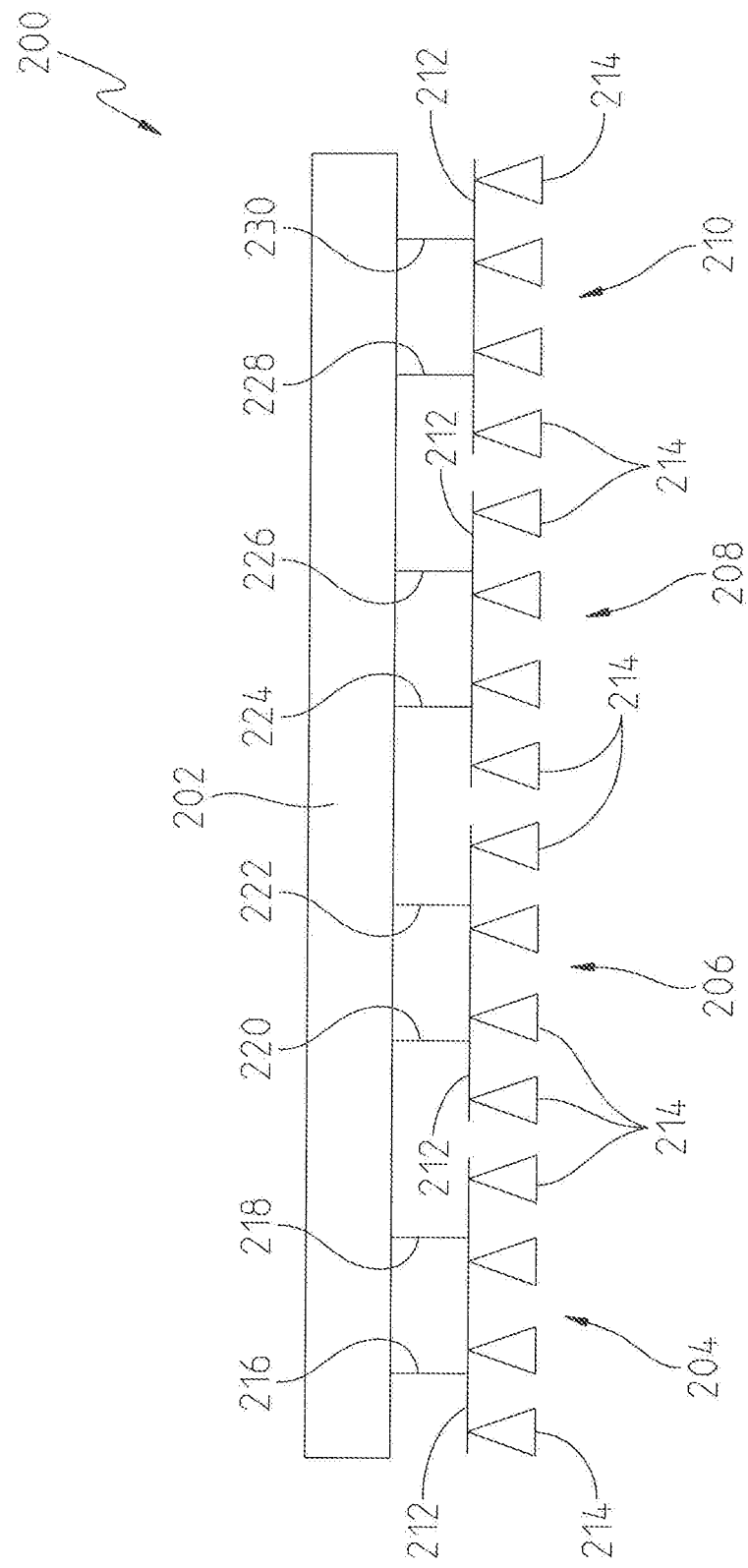
FIG. 2 is a schematic of a sprayer boom frame with a plurality of sections configured for independent section boom height control.
Figure 3:
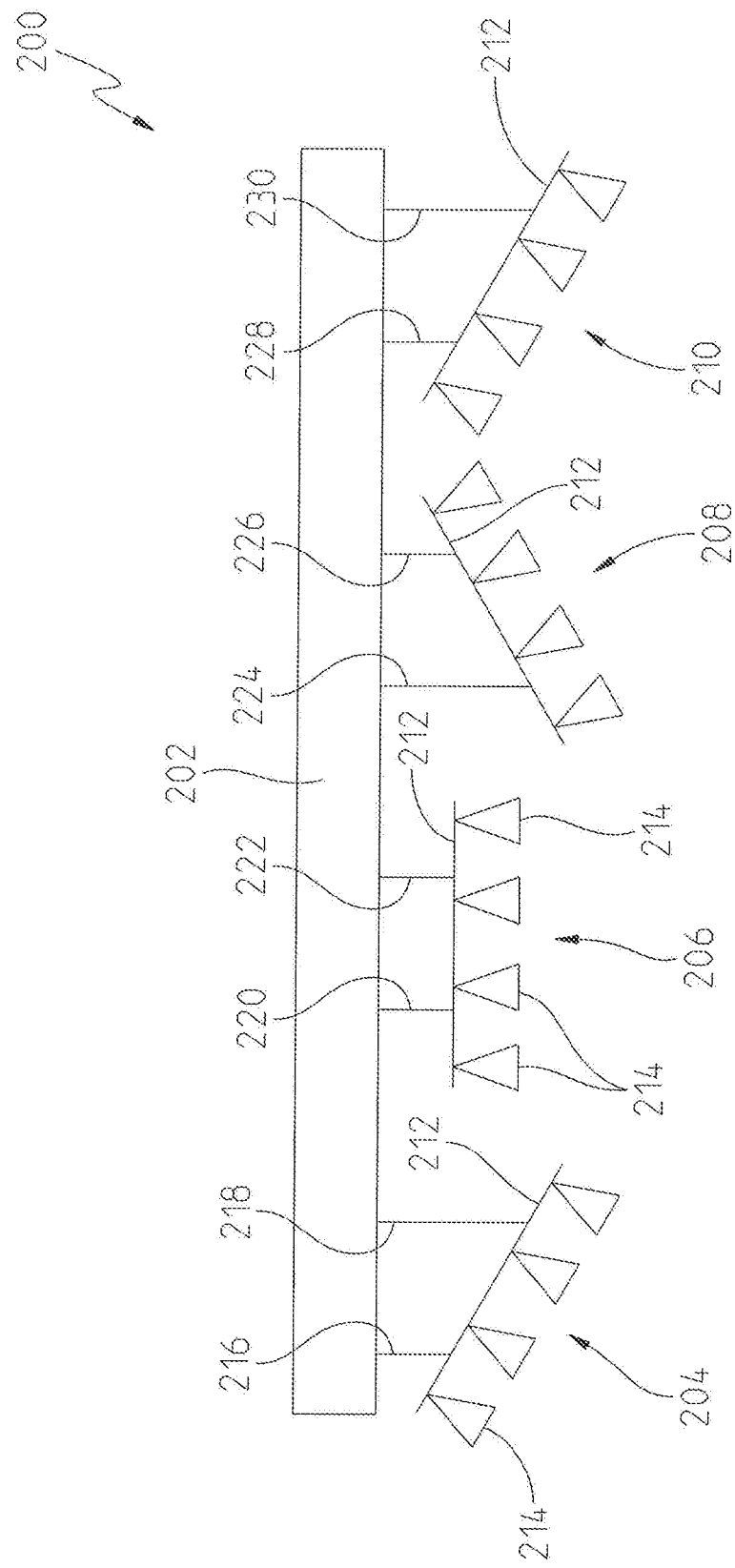
FIG. 3 is another schematic of the spray boom frame of FIG. 2.

Thus, this disclosure provides one or more embodiments of sectional boom height control for individual sections of a sprayer. In this disclosure, the use of tilt control via the aforementioned tilt actuators may be combined with the use of vertical movement control at each respective boom section. Referring to FIGS. 1-3, each boom frame may include one or more individual boom sections. In other words, the first inner boom frame 126 may include one or more boom sections to which a plurality of nozzles is coupled. In FIG. 2, for example, one embodiment of a spray boom assembly 200 is illustrated. The spray boom assembly 200 may be similar to the spray boom assembly 100 of FIG. 1. Here, the spray boom assembly 200 includes a boom frame 202 similar to the various boom frames 124, 126, 128, 130, 132, 134, 136 shown in FIG. 1. The boom frame 202 may include a first boom section 204, a second boom section 206, a third boom section 208, and a fourth boom section 210. Each boom section may include a spray pipe 212 which is fluidly coupled to a fluid source such as the tank 110. Moreover, a plurality of nozzles 214 are fluidly coupled to the respective spray pipe 212.

In the illustrated embodiment of FIG. 2, the first boom section 204 may include a first actuator 216 and a second actuator 218. The first actuator 216 may be offset or spaced from the second actuator 218. For example, the first actuator 216 may be coupled between the boom frame 202 and the spray pipe 212 near a first end of the spray pipe 212, and the second actuator 218 may be coupled between the boom frame 202 and the spray pipe 212 near a second or opposite end of the spray pipe 212. Each of the two actuators may be electrically coupled to a main controller which controls actuation of both. The controller may be configured to independently control each actuator. The actuators may be powered electrically, hydraulically, mechanically, pneumatically, or any combination thereof. The same may be said for the tilt actuators, lift actuators, and any other actuator described herein.

Similar to the first boom section 204, the second boom section 206 may also include a first actuator 220 and a second actuator 222. The two actuators may be spaced from one another such that the first actuator 220 can vertically control the position and orientation of one end of the spray pipe 212, whereas the second actuator 222 can vertically control the position and orientation of the opposite end of the spray pipe 212. Moreover, the first and second actuators may also be electrically coupled to the controller (not shown) such that the controller is able to actuate the actuators of the second boom section 206 independent of one another and independent of the first and second actuators of the first boom section 204.

The third boom section 208 further includes a first actuator 224 and a second actuator 226 as shown in FIG. 2. The two actuators may be spaced or offset from one another such that the first actuator 224 is able to raise or lower one end of the spray pipe 212, whereas the other actuator 226 is able to raise or lower the opposite end of the spray pipe 212. A main controller (not shown) may further electrically control the first and second actuators independently of one another and independent of the other actuators of the first and second boom sections.

The fourth boom section 210 may also include a first actuator 228 and a second actuator 230. The two actuators may be spaced from one another such that the first actuator 228 can vertically control the position and orientation of one end of the spray pipe 212, whereas the second actuator 230 can vertically control the position and orientation of the opposite end of the spray pipe 212. Moreover, the first and second actuators may also be electrically coupled to and controlled by a main controller (not shown) such that the controller is able to actuate the actuators of the fourth boom section 210 independent of one another and independent of the actuators of the other three boom sections.

In FIG. 3, the spray boom assembly 200 is shown with the different boom sections being controlled independently of one another. In the first boom section 204, the second actuator 218 is actuated to extend and lower its end of the spray pipe 212 such that the spray pipe 212 is oriented at an angle. This may be controlled by a main controller in order to avoid an object, for example. In the second spray section, neither actuator is actuated and the spray pipe remains at the same position as shown in FIG. 2. With respect to the third spray section 208, the first actuator 224 is actuated to extend and lower its end of the spray pipe 212. The fourth spray section 210 is shown being controlled such that the second actuator 230 is actuated to lower its end of the spray pipe 212.

The embodiment of FIG. 3 is only provided as an example to illustrate improved, independent height control by adjusting vertical movement of each spraying section. Moreover, each spray section includes a smaller set or grouping of nozzles compared to the overall boom frame to which the spray sections are connected. Thus, the nozzles on each spray section may be dynamically controlled by monitoring crop height and adjusting the distance between each nozzle and the crop. Moreover, this additional control can reduce or eliminate problems associated with drift and thus provides improved drift control. In addition, while FIGS. 2 and 3 do not show the tilt actuators, the embodiment of FIG. 4 does illustrate both actuators. The tilt actuators may still pivot or adjust an entire boom along with the individual boom frames and boom sections coupled thereto. However, with the improved boom section height control feature of the present disclosure, the sprayer is able to avoid objects and the like while still maintaining a desired or target spray height. In this disclosure, target spray height may refer to the distance a nozzle is from the ground or a crop it is spraying.

Figure 4:
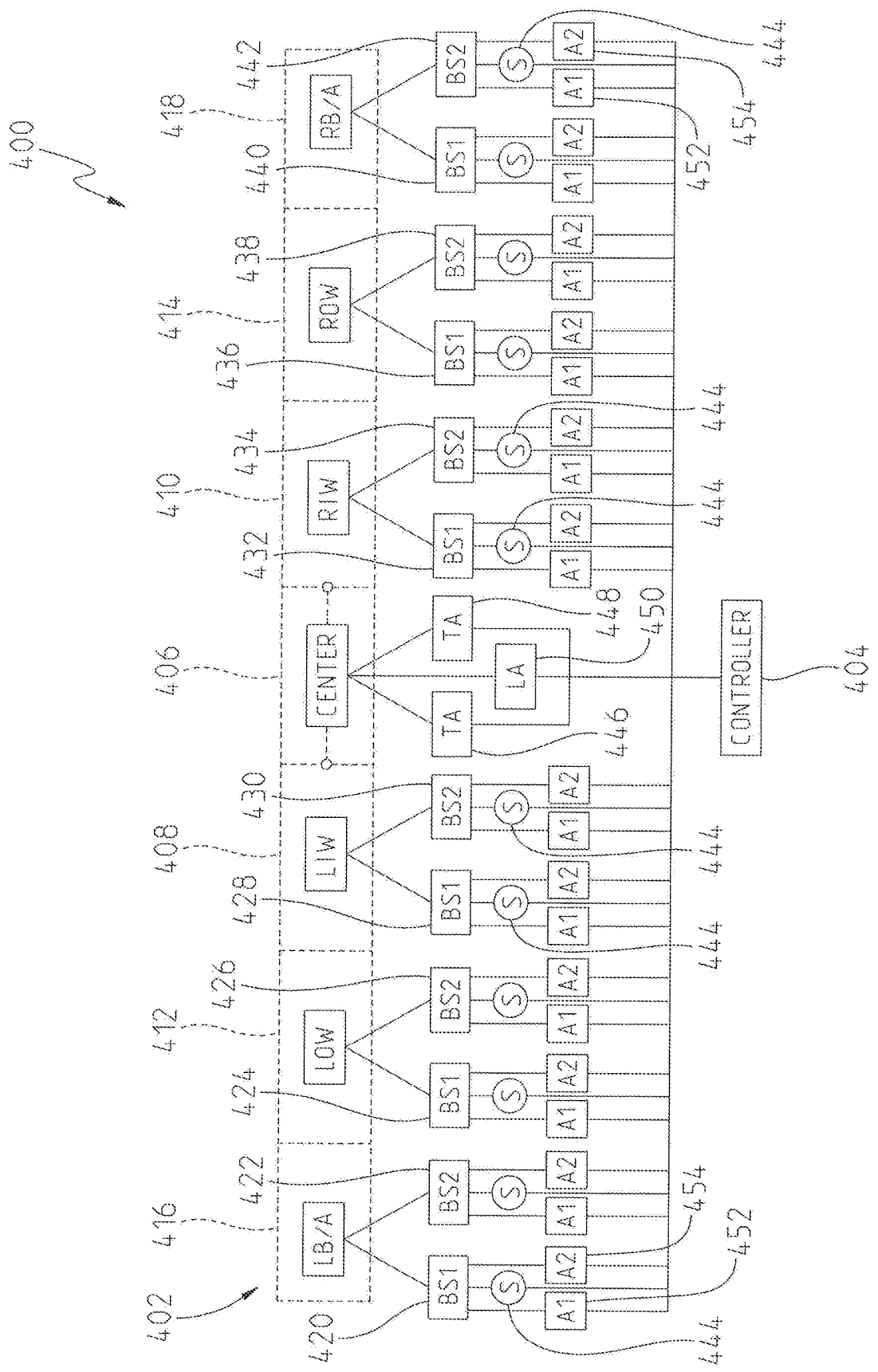
FIG. 4 is a schematic of a sprayer control system for controlling independent section boom height.

Turning to FIG. 4, one embodiment of a control system 400 is shown for providing the improved boom section height control and drift control. In this system 400, a controller 404 may be provided for controlling the sprayer and its operation. The controller 404 may include a memory unit for storing algorithms, software, lookup tables, and the like. A processor within the controller 404 may execute instructions via the algorithms, software, etc. for controlling the sprayer. The controller 404 may be any type of controller. It may be an engine controller, a transmission controller, a machine or vehicle controller, or any other known type of controller. The controller 404 may be capable of communicating with different components on the sprayer, and it may further send or transmit wireless signals to a remote location such as a database, server, etc. Moreover, the controller 404 may be capable of receiving communications wirelessly from a remote location.

The sprayer may be similar to the one illustrated in FIGS. 1-3. The sprayer may include a boom assembly 402 having a center boom frame 406, a first inner boom frame 408 (or left inner wing), a second inner boom frame 410 (or right inner wing), a first outer boom frame 412 (or left outer wing), a second outer boom frame 414 (or right outer wing), a first breakaway frame 416 (or left breakaway), and a second breakaway frame 418 (or right breakaway). The first inner boom frame 408, the first outer boom frame 412, and the first breakaway frame 416 may form part of a first boom which is coupled to a center frame or center boom frame 406. The first boom may be pivoted with respect to this center boom frame 406 via a first tilt actuator 446. Likewise, the second inner boom frame 410, the second outer boom frame 414, and the second breakaway frame 418 may form part of a second boom which is coupled to a center frame or center boom frame 406. The second boom may be pivoted with respect to this center boom frame 406 via a second tilt actuator 448.

The center boom frame 406 may be raised and lowered relative to the ground via a lift actuator 450. In some instances, as the center boom frame 406 is raised and lowered by the lift actuator 450, the first and second booms (and thus each boom frame) is also raised and lowered along with the center boom frame 406.

As also shown in FIG. 4, each boom frame may include a plurality of boom sections similar to those described with respect to FIGS. 2 and 3. For example, the first breakaway frame 416 may include a first boom section 420 and a second boom section 422. The first outer boom frame 412 may include a first boom section 424 and a second boom section 426. The first inner boom frame 408 may include a first boom section 428 and a second boom section 430. The center boom frame 406 is not shown having any boom sections, but the center boom frame 406 may include one or more boom sections. The second inner boom frame 410 may include a first boom section 432 and a second boom section 434. The second outer boom frame 414 may also include a first boom section 436 and a second boom section 438. Lastly, the second breakaway frame 418 may include a first boom section 440 and a second boom section 442. While each boom frame is described and shown as having two boom sections, in other embodiments the boom frames may have any number of boom sections. Moreover, while a total of seven boom frames are shown in FIG. 4, other embodiments may include one or more boom frames.

Each boom section illustrated in FIG. 4 is shown having a first actuator 452, a second actuator 454 and a sensor 444 coupled thereto. Crop height or other distance measurements may be detected by the sensors 444 and communicated to the controller 404. As such, each sensor 444 is disposed in electrical communication with the controller 404. The sensors 444 may be an ultrasonic sensor, a laser-based crop height sensor, a camera-based crop height sensor, or any other known sensor capable of detecting a distance between two objects. Sensors 444 may also be disposed at each end of the first boom and second boom. Conventional sprayer systems may include a single sensor on each boom frame, whereas as shown in FIG. 4 there may be a sensor located on each boom section. Thus, each boom frame may include a plurality of sensors mounted thereon.

The individual spray section actuators are able to provide positive feedback with which the height of each boom section is measured and adjusted independently. In other words, the first and second actuators on the first boom section 420 of the breakaway frame 416 may be controlled independently of one another by the controller 404. The sensor(s) 444 located on the first boom section 420 may communicate the position of each actuator and the corresponding height of the boom section. At the same time, the controller 404 may be able to operably control the section height of the second boom section 422 of the first breakaway frame 416. Moreover, the controller 404 may be able to control the actuators on each boom section of the other boom frames at the same time, and thus more precise control along the entire spray boom assembly is achievable. In combination with tilt control and lift control, the controller 404 is better able to control the height each nozzle is from the ground or crop as the sprayer moves about different terrain.

Although spray pipes and nozzles are not shown in FIG. 4, each spray section may include a plurality of nozzles coupled thereto for spraying a substance onto a crop or surface. The substance may be stored in a tank as described with respect to FIG. 1, and distributed to each spray section via a distribution or spray pipe. Other ways of fluidly coupling each nozzle to a fluid source may be used as known by the skilled artisan.

In a different embodiment of FIG. 4, the control system 400 may further be capable of controlling the individual boom sections without the need for a tilt actuator. In other words, the individual boom section actuators 452, 454 may be used for tilting or orienting each boom section at an angle that would otherwise be achieved via the tilt actuators. In this embodiment, neither tilt actuator is present and the controller 404 is able to tilt or angularly dispose each boom through the use of the different section actuators.

Another embodiment of the present disclosure is shown in FIG. 5. In this embodiment, a boom section 500 of a boom frame is shown. The boom section 500 may include a section actuator 502 for raising and lowering the entire boom section 500 relative to a boom frame in a substantially linear direction 520. The boom section 500 may further include a spray pipe 504 through which fluid may flow and be supplied to individual nozzles 506 which are mounted to the spray pipe 504.

In addition to the section actuator 502, the boom section 500 may also include a first actuator 508 and a second actuator 510 spaced from one another along the spray pipe 504. The actuators may be further coupled to a cover frame 512 as shown in FIG. 5. Thus, the entire spray section 500 may be moved vertically via the section actuator 502, whereas the spray pipe 504 and nozzles 506 may be raised or lowered independently of the cover frame 512 via the first and second actuators. This additional control may allow for improved section height control and improved drift control.

The cover frame 512 may be used to protect the nozzles 506 during a spraying operation. The cover frame 512 may include a top or base portion 514 which is coupled at one end to the section actuator 502. The cover frame 512 may also include a first side portion 516 and a second side portion 518. Each side portion may extend below the nozzles 506 to prevent the nozzles from contacting a crop or the ground. In this manner, the cover frame 512 functions as a shield by protecting the nozzles and their spray tips.

While the cover frame 512 of FIG. 5 includes two sides, it is further contemplated in other embodiments that the cover frame 512 may include a single side, i.e., the first side 516. Alternatively, other embodiments may include additional sides to surround the spray pipe 504 and nozzles 506 on all sides except for directly underneath. In some cases, a bottom side may be provided but which includes openings through which the spray from each nozzle is able to pass and reach the crop or ground.

Although not shown in scale in FIG. 5, the cover frame 512 may include at least one side or part of one side that extends below a further distance one of the nozzles 506 may be lowered by either the first actuator 508 or second actuator 510. In other words, the cover frame 512 has at least one portion which is lower than all of the nozzles when either the first or second actuator is fully extended. In doing so, this ensures that the nozzles are protected against contact with the ground, crop or another object.

Referring to FIG. 6, another spray boom assembly 600 is shown. In this embodiment, the spray boom assembly 600 is shown having a boom frame 602 similar the center boom frame, the first and the second inner and outer boom frames of FIGS. 1 and 4. The boom frame 602 may include a plurality of boom sections including a first boom section 604, a second boom section 606, and a third boom section 608. Each boom section may be mounted to the boom frame 602 such that each section is stationary with respect to the boom frame 602.

The first boom section 604 may include a first spray pipe 610 to which a plurality of nozzles 616 is coupled. The second boom section 606 may include a second spray pipe 612 to which a plurality of nozzles 618 is coupled, and the third boom section 608 may include a third spray pipe 614 to which a plurality of nozzles 620 is coupled. In this embodiment, the spray sections may move upon movement of the entire boom frame 602. This may be the result of a tilt actuator causing the boom frame 602 to move, or via some other actuator.

In FIG. 7, a different spray boom assembly 700 is shown. The spray boom assembly 700 includes a boom frame 702 having a plurality of different boom sections. In this embodiment, the boom frame 702 may include a first boom section 704, a second boom section 706, and a third boom section 708. The first boom section 704 may include a spray pipe 710 to which a plurality of nozzles 716 is coupled thereto. The second boom section 706 may include a spray pipe 712 as well, and a plurality of nozzles 718 may be coupled to the spray pipe 712. The third boom section 708 may include a spray pipe 714 to which a third plurality of nozzles 720 may be coupled thereto.

Unlike the embodiment of FIG. 6, the embodiment of FIG. 7 provides for an improved section height control. Here, the first boom section 704 may be raised and lowered independent of the boom frame 702 via a first actuator 722. The second boom section 706 may be raised and lowered independent of the boom frame 702 via a second actuator 724. Similarly, the third boom section 708 may be raised and lowered independent of the boom frame 702 via a third actuator 726. In each case, the first boom section 704 may be raised or lowered relative to the boom frame 702 independently of the second and third boom sections. Likewise, each of the second and third boom sections may be raised or lowered independently of one another and the first boom section. This independent section control provides more precise spraying and reduces drift.

Another feature of FIG. 7 is that each spray section may include a movable plumbing frame which supports the plurality of nozzles. The plumbing frame may include hoses, pipes, and other fluid-transferring mechanisms for fluidly coupling a fluid source (e.g., the tank 110) to each nozzle 718. With the extension and retraction of each spray section, the plumbing to and from each nozzle may require a movable frame for the supply of liquid spray to each nozzle. In FIG. 7, the first spray section 704 includes a first movable plumbing frame 728. The first plumbing frame 728 may be moved linearly via the first actuator 722. The first spray pipe 710 may also be coupled to the first plumbing frame 728 as shown in FIG. 7. A flex pipe (not shown) may be used for fluidly coupling the spray pipe 710 to a section pipe or other distribution pipe and for supplying fluid from a tank or fluid source to each nozzle 716.

Similarly, the second boom section 706 may also include a movable plumbing frame 730 as shown in FIG. 7. The movable plumbing frame 730 may raise and lower via actuation from the second actuator 724. The second spray pipe 712 may be coupled to the second plumbing frame 730. Likewise, the third boom section 708 may include a movable plumbing frame 732. The third movable plumbing frame 732 may move in a linear direction via the third actuator 726. The third spray pipe 714 may be coupled to the third plumbing frame 732.

Although not shown in detail, each plumbing frame may include a cover frame similar to that shown in FIG. 5. Any type of shielding or protective cover may be used for protecting the nozzles, and in FIG. 7 the shield or protective cover may be coupled to the plumbing frame as needed.

Figure 8:
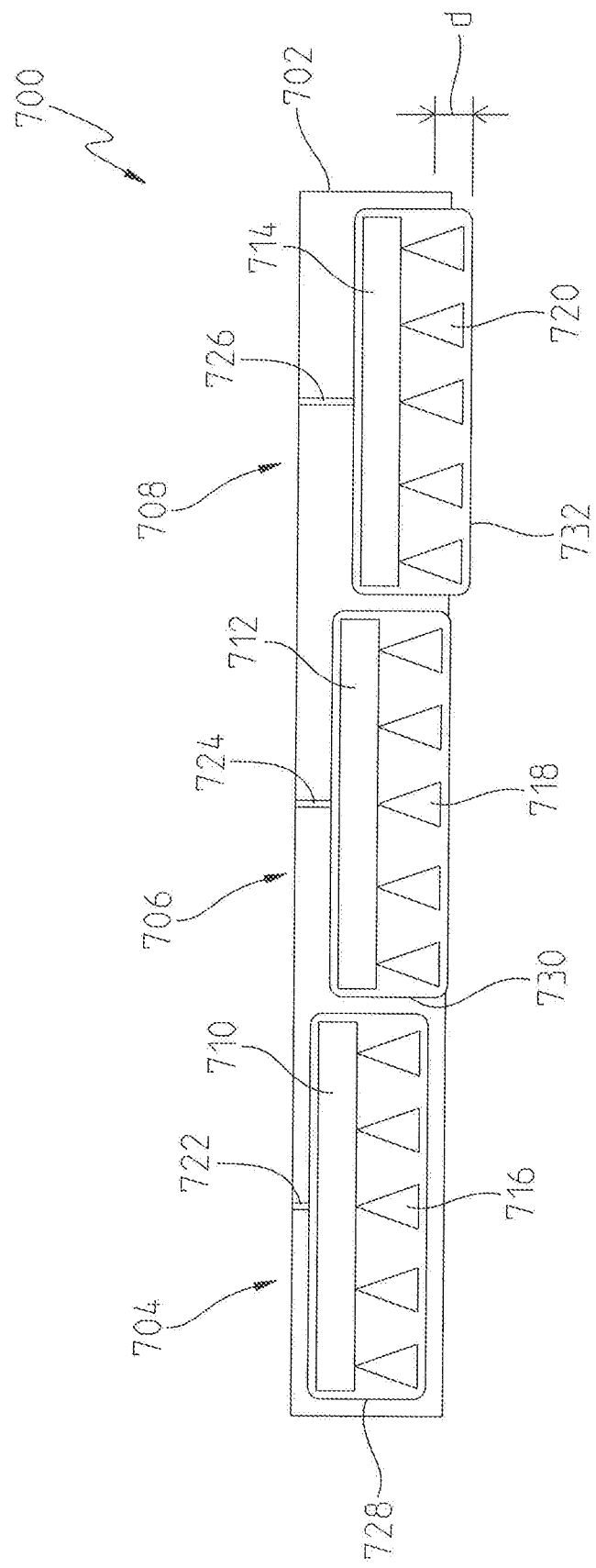
FIG. 8 is a schematic of a third embodiment of the frame of FIG. 5.

Referring to FIG. 8, an example of the sprayer boom assembly 700 of FIG. 7 is shown. In this example, the first boom section 704 is disposed in its normal position. In other words, the actuator 722 has not actuated the first boom section 704 in either a raised or lowered direction. The second boom section 706, however, has been lowered a first distance by the second actuator 724. In this example, the second boom section 706 is shown at a position lower than the first boom section 704. The third boom section 708 is also shown lowered by the third actuator 726. Here, the third boom section 708 is lowered even further than the second boom section 706. In one non-limiting example, the third boom section 708 may be lowered by a distance, d, of about 12-18 inches. This distance is only provided as an example, and the distance the boom section is raised or lowered may depend upon the type of boom and the design of the shielding used for the given boom section. For those boom sections that do not include shielding, the boom section may be lowered less than the boom section that has shielding. In any event, the example of FIG. 8 illustrates how each boom section along the same boom frame may be raised or lowered independent of the other boom sections along the same boom frame. As a result, increased productivity is possible due to more precision with the various boom sections and nozzles, and there is less drift due to this increased control.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A spray boom of a spray boom assembly, comprising:
a boom frame;
a spray pipe configured to be fluidly coupled to a fluid source;
a plurality of nozzles coupled to the spray pipe and configured to be fluidly coupled to the fluid source via the spray pipe;
a frame comprising a shield portion for protecting the plurality of nozzles; and
at least one actuator coupled between the boom frame and the frame, the at least one actuator being movable between a retracted position and an extended position to move the frame, spray pipe and plurality nozzles relative to the boom frame;
wherein, in at least the retracted position, the frame, spray pipe and plurality of nozzles are located above a lowermost surface of the boom frame;
wherein, in at least the extended position, at least a portion of the frame and at least one nozzle of the plurality of nozzles are partially located below the lowermost surface of the boom frame;
wherein the shield portion comprises a first portion positioned forward of the plurality of nozzles and a second portion positioned rearward of the plurality of nozzles;
wherein, the first portion is parallel to the second portion;
wherein, during actuation of the at least one actuator between the retracted position and the extended position, the spray pipe moves within a single plane.

2. The spray boom of claim 1, further comprising a controller coupled to the at least one actuator for controlling movement of the frame, the spray pipe and plurality of nozzles relative to the boom frame.

3. The spray boom of claim 1, wherein the plurality of nozzles is located at least partially below the spray pipe.

4. The spray boom of claim 1, wherein the frame partially encloses the spray pipe and plurality of nozzles.

5. The spray boom of claim 1, wherein the frame comprises a base portion coupled to the at least one actuator.

6. The spray boom of claim 1, wherein the shield portion extends downwardly to a location that is lower than the plurality of nozzles.

7. The spray boom of claim 1, wherein the at least one actuator comprises a first actuator and a second actuator, the first and second actuators being coupled between the frame and the boom frame.

8. The spray boom of claim 1, further comprising a second actuator coupled between the frame and the spray pipe, where the second actuator moves between an extended position and a retracted position to move the spray pipe and the plurality of nozzles relative to the frame.

9. The spray boom of claim 1, wherein the spray pipe moves in a vertical direction within the single plane.

10. The spray boom of claim 1, wherein the spray pipe moves within the single plane at a location directly below the boom frame.

11. A spray boom of a spray boom assembly, comprising:
a boom frame;
a plurality of boom sections movably coupled to the boom frame, the plurality of boom sections comprising at least a first boom section;
at least one actuator coupled between the boom frame and the first boom section, the at least one actuator being movable between a retracted position and an extended position to move the first boom section relative to the boom frame;
a spray pipe of the first boom section configured to be fluidly coupled to a fluid source;
a plurality of nozzles coupled to the spray pipe and configured to be fluidly coupled to the fluid source via the spray pipe;
a frame of the first boom section comprising a shield portion for protecting the plurality of nozzles;
wherein, in a first position defined between the retracted position and the extended position, the first boom section is located within the boom frame;
wherein, in a second position defined between the first position and the extended position, the first boom section is at least partially located outside of and below the boom frame;
wherein the shield portion is located on at least three sides of the plurality of nozzles;
wherein the shield portion comprises at least a first side, a second side, and a third side, where at least two of the first, second, and third sides of the shield portion are parallel to one another;
in the first position, the entire frame and each of the plurality of nozzles are located within the boom frame;
in the second position, at least a portion of the frame and at least one of the plurality of nozzles is located outside of and below the boom frame.

12. The spray boom of claim 11, wherein:
in the first position, the first boom section is located above a lowermost surface of the boom frame;
in the second position, the first boom section is partially located below the lowermost surface of the boom frame.

13. The spray boom of claim 11, wherein the plurality of nozzles is located at least partially below the spray pipe.

14. The spray boom of claim 11, wherein the frame partially encloses the spray pipe and plurality of nozzles.

15. The spray boom of claim 11, wherein the at least one actuator comprises a first actuator and a second actuator coupled between the boom frame and the first boom section.

16. A spray boom of a spray boom assembly, comprising:
a boom frame;
a plurality of boom sections movably coupled to the boom frame, the plurality of boom sections comprising at least a first boom section and a second boom section;
a first spray pipe of the first boom section and a second spray pipe of the second boom section configured to be fluidly coupled to a fluid source;
a first plurality of nozzles coupled to the first spray pipe and configured to be fluidly coupled to the fluid source via the first spray pipe;
a second plurality of nozzles coupled to the second spray pipe and configured to be fluidly coupled to the fluid source via the second spray pipe;
a first frame of the first boom section comprising a shield portion for protecting the first plurality of nozzles;
a second frame of the second boom section comprising a shield portion for protecting the second plurality of nozzles;
a plurality of actuators including at least a first actuator and a second actuator, the first actuator coupled between the boom frame and the first boom section and the second actuator coupled between the boom frame and the second boom section, wherein the first and second actuators are movable between a retracted position and an extended position to move the respective first boom section and second boom section independently of one another and relative to the boom frame;
wherein, in a first position defined between the retracted position and the extended position of the first actuator, the first boom section is located above a lowermost surface of the boom frame;
wherein, in a second position defined between the first position and the extended position of the first actuator, the first boom section is at least partially located below the lowermost surface of the boom frame;
wherein the shield portion comprises a first portion and a second portion, the first portion being perpendicular to the second portion;
wherein, during movement of the first actuator between the retracted position and the extended position, the first frame and the first spray pipe remain positioned directly below the first boom frame.

17. The spray boom of claim 16, wherein:
in the first position, the first boom section is located within the boom frame; and
in the second position, the first boom section is at least partially located outside of and below the boom frame.

18. The spray boom of claim 16, wherein:
in a first position defined between the retracted position and the extended position of the second actuator, the second boom section is located above a lowermost surface of the boom frame;
in a second position defined between the first position and the extended position of the second actuator, the second boom section is at least partially located below the lowermost surface of the boom frame.

19. The spray boom of claim 18, wherein:
in the first position of the second actuator, the second boom section is located within the boom frame; and
in the second position of the second actuator, the second boom section is at least partially located outside of and below the boom frame.

20. The spray boom of claim 16, wherein:
the first actuator is coupled between the first frame and the boom frame; and the second actuator is coupled between the second frame and the boom frame.

\* \* \* \* \*